United States Patent [19]

Sorko-Ram

[11] Patent Number: 4,533,591

[45] Date of Patent: Aug. 6, 1985

[54] PROCESS FOR PRODUCING A DEVICE FOR REFLECTING ELECTROMAGNETIC ENERGY AND PRODUCT PRODUCED THEREBY

[76] Inventor: Paul O. Sorko-Ram, 1111 N. Centerville, Sturgis, Mich. 49091

[21] Appl. No.: 553,497

[22] Filed: Nov. 21, 1983

Related U.S. Application Data

[62] Division of Ser. No. 440,912, Nov. 12, 1982.

[51] Int. Cl.[3] .......... B32B 5/02

[52] U.S. Cl. .......... 428/213; 428/283; 428/328; 428/332; 428/912.2; 428/242; 428/461

[58] Field of Search .......... 264/1.9; 428/67, 328, 428/912.2, 105, 204, 206, 208, 242, 283, 332

[56] References Cited

U.S. PATENT DOCUMENTS

| | | | |
|---|---|---|---|
| 2,387,308 | 10/1945 | Styll | 264/1.9 |
| 3,242,001 | 3/1966 | Lucas | 428/328 |
| 3,876,552 | 4/1975 | Moynihan | 428/328 |
| 3,958,062 | 5/1976 | Moynihan | 428/328 |
| 4,162,343 | 7/1979 | Wilcox et al. | 428/912.2 |
| 4,311,757 | 1/1982 | Raghava et al. | 428/207 |
| 4,339,400 | 7/1982 | Sorko-Ram | 264/1.9 |
| 4,436,377 | 3/1984 | Miller | 428/204 |

*Primary Examiner*—George F. Lesmes
*Assistant Examiner*—William M. Atkinson
*Attorney, Agent, or Firm*—Krass & Young

[57] ABSTRACT

A device for reflecting electromagnetic energy is produced by introducing a dispersion of discrete electromagnetically reflective particles into a volume of uncured thermoplastic resin which allows the radiation to pass therethrough. The particles are deposited onto one surface of the layer of the resin and may be allowed to migrate, through the influence of gravity, toward the other surface thereof to form a strata which reflects electromagnetic radiation passing through the thermoplastic layer. Alternatively, the reflective particles may assume a distributed state within the uncured resin and a sheet of wire mesh or metal coated fabric may be introduced into the resin in order to aid in establishing the electrical continuity between the particles required to reflect the electromagnetic energy. The resin is then cured to fix and protectively cover the reflective particles. The reflector device may be produced in a flat sheet and then formed to the desired shape or may be produced in a mold conforming to the final configuration.

4 Claims, 15 Drawing Figures

PROCESS FOR PRODUCING A DEVICE FOR REFLECTING ELECTROMAGNETIC ENERGY AND PRODUCT PRODUCED THEREBY

This application is a division of application Ser. No. 440,912, filed 11/12/82.

TECHNICAL FIELD

The present invention broadly relates to a device for reflecting electromagnetic radiation, and deals more particularly with a process for producing a lightweight, plastic reflector.

BACKGROUND ART

The need for lightweight, low cost electromagnetic radiation reflectors continues to increase because of advances in radio communications and solar energy collector applications. In the past, in order to satisfy this need, lightweight reflectors have been manufactured using thermoplastic resins, such as clear acrylic. These plastic reflectors are typically produced by thermoforming a substantially flat sheet of plastic to the desired shape and then vapor depositing a layer of reflective metallization on one side of the sheet. A suitable coating or other lightweight, structurally reinforcing material is then applied over the layer of metallization to provide the reflector with rigidity and protectively sandwich the layer of metallization so as to avoid damage thereto.

The prior process is effective in providing a high quality product but is somewhat undersirable in that a number of processing steps must be performed over a period of time, i.e. molding the plastic to the desired shape, metallizing one surface of the plastic, applying a protective coating over the metallization, etc.

It is therefore a primary object of the present invention to provide an improved, more efficient process for producing a lightweight radiant energy reflector which avoids the deficiencies of the prior process discussed above.

Another object of the invention is to provide a radiant energy reflector produced by a process which requires substantially less time and labor compared to the prior art.

A still further object of the invention is to provide a process for producing a radiant energy reflector of the type described above which permits the formation of a reflective layer substantially simultaneous with the forming of the thermoplastic, protective sheet.

These and further objects of the invention will be made clear or will become apparent during the course of the following description of the preferred embodiment of the invention.

SUMMARY OF THE INVENTION

According to the present invention, a process for producing an electromagnetic radiation reflector includes the steps of providing a layer of substantially uncured thermoplastic resin; introducing a quantity of particulates into the uncured resin, each of the particulates being reflective to electromagnetic radiation; urging the particulates to migrate through the uncured thermoplastic resin to form a reflective layer; and, then curing the thermoplastic resin. The process may be performed by charging an open mold conforming to the final configuration of the reflector with the resin or by thermoforming a substantially flat sheet of thermoplastic having the reflective layer preformed therein. The reflective particles are preferably introduced into the uncured resin as a dispersion which is allowed under the influence of gravity to migrate through the resin layer. The particulates may assume a distributed state within the resin or may be allowed to migrate entirely toward the lower surface of the resin layer to form a reflective strata. After curing, the reflective particles are substantially embedded within the plastic, thereby avoiding the need for applying a protective coating over the reflective layer of the device as was required in prior art constructions. A continuous, distributed metal conductor such as a sheet of wire mesh or wire coated fabric may be introduced into the uncured resin which sheet becomes embedded in the plastic after the resin has cured in order to increase the level of electrical conductivity between the particles to the extent necessary for achieving high reflectivity. The distributed conductor may be sandwiched between two sheets of plastic or embedded in a plastic sheet prior to introduction into the uncured resin in order to control the attitude of the conductor within the resin.

BRIEF DESCRIPTION OF THE DRAWINGS

In the drawings wherein like reference numerals are employed to designate identical components in the various views.

BEST MODE FOR CARRYING OUT THE INVENTION

Figure 5:
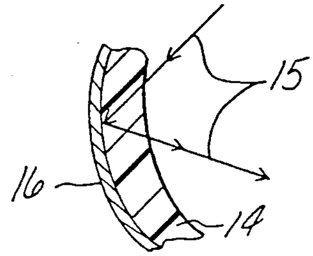
FIG. 5 is a sectional view taken along the line 5—5 in FIG. 1.
Figure 1:
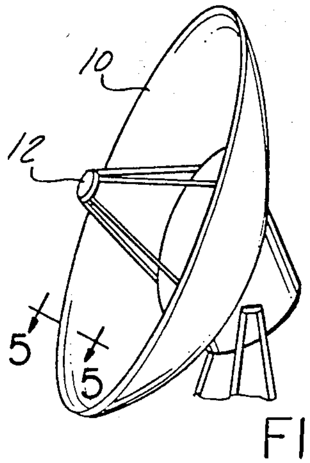
FIG. 1 is a perspective view of a device for reflecting electromagnetic energy.

Referring first to FIGS. 1 and 5, the present invention is broadly concerned with a process for producing a device 10 for reflecting electromagnetic radiation. The device 10 may be employed, for example, for receiving radio waves or collecting solar energy. As particularly shown in the drawings, the device 10 is substantially dish-shaped so as to focus and concentrate the radiation on a collecting element 12 positioned at the focal point of the radiation reflected from the concave side of the device 10. It is to be understood, however, that the process according to the present invention is equally applicable to reflectors of virtually any geometric configuration, including flat reflectors.

The device 10 includes an inner layer 14 of thermoplastic material which is transparent to the wavelengths to be reflected. The thermoplastic from which the inner layer 14 is formed preferably comprises acrylic, but, alternatively may consist of acetate, styrene or the like; acrylic as used herein is defined as any thermoplastic material having a substantially methlmethacrylate base. A substantially continuous reflective strata 16 essentially coextensive with the plastic layer 14 is disposed adjacent the convex side of the reflector device 10. Waves 15 of radiation passing through the plastic layer 14 are reflected from strata 16 back through layer 14.

Figure 2:
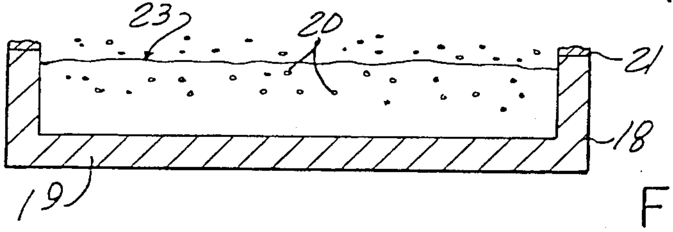
FIGS. 2–4 are cross sectional views of an open mold showing the successive steps in the process according to the present invention.
Figure 3:
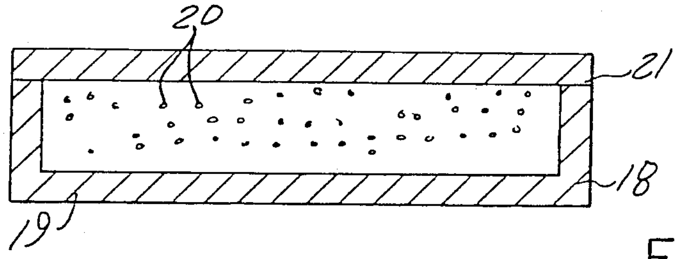
Figure 4:
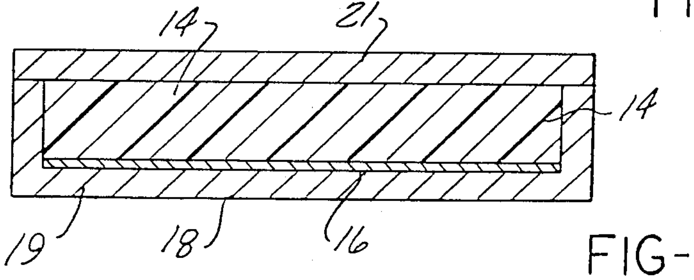

Referring now to FIGS. 2–4, the device 10 is produced by first introducing a quantity of substantially uncured, thermoplastic or thermosetting resin into a closed mold 18 having a base 19 and a removable top 21. Mold 18 may define a substantially flat mold cavity so as to produce flat sheets of plastic which may later be formed to a desired configuration, or, alternatively, may define cavities which conform to the final configuration of the device 10. In any event, with the mold cavity filled with uncured plastic resin, a dispersion of electromagnetically reflective particles 20 is deposited onto the upper surface 23 of the uncured resin while top 21 is removed. The particles 20 may consist of any suitable material which is reflective of electromagnetic radiation, such as aluminum or the like. The particles 20 preferably range in size from submicron to approximately 4 mesh and possess a density greater than that of the thermoplastic resin so as to be drawn by the influence of gravity from the upper surface 23 down through the resin. It is to be recognized, however, that the dispersion of particles 20 could also be urged down into the resin layer by other techniques, such as the application thereto of centrifugal force or the like.

Figure 6:
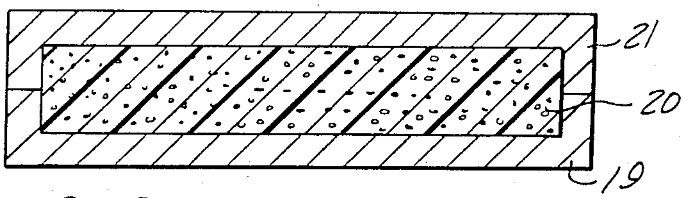
FIG. 6 is a view similar to FIG. 4 but showing an alternate form of the device.

Because the density of the particles 20 exceeds that of the uncured plastic resin, the dispersion of particles 20 is drawn through the layer of resin toward the bottom of the mold cavity. Depending on the density and cure state of the resin compared to that of the particles 20, substantially all of the particles 20 may accumulate at the bottom of the mold cavity, as shown in FIG. 4, to form a substantially continuous reflective strata 16. The plastic resin is then cured, thereby fixing the particles 20 in position to maintain the particles 20 in the strata 16. Alternatively, however, the densities and cure state may be selected such that the particles 20 do not migrate entirely to the bottom of the mold cavity but rather, as shown in FIG. 6, become (and remain) distributed throughout much of the depths of the resin layer during and after curing thereof.

After curing of the plastic resin, the resultant structure comprising the cured thermoplastic resin and particles 20 is moved from the mold 18 and subsequently may be formed, using conventional thermoforming techniques, into the desired geometrical shape. The cured plastic resin binds the particles 20 and also forms, to a substantial extent, a protective outer cover over the particles 20 which prevents damage thereto, by scratching, marring or the like.

The composite of the cured thermoplastic and particles 20 may be reinforced by coating the rear of the device 10 with other plastics applied over layer 14 by foaming or spraying techniques. Chopped fiberglass may be introduced into the foamed or sprayed plastic to increase rigidity.

Figure 7:
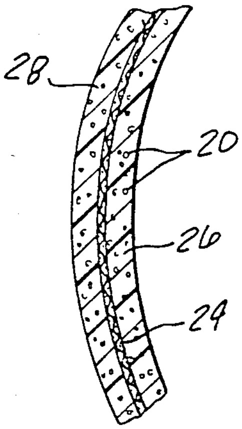
FIG. 7 is a view similar to FIG. 5 but depicting still another alternate form of the device.
Figure 8:
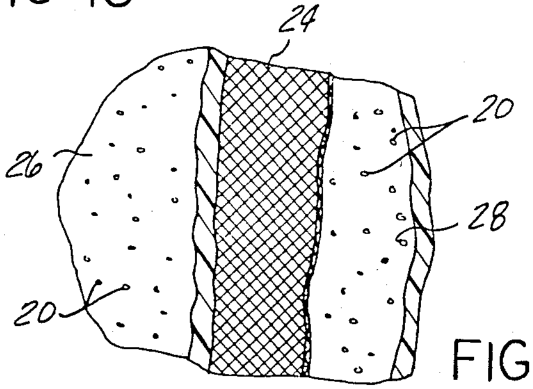
FIG. 8 is a fragmentary, front view of the device shown in FIG. 7, portions of each layer of material being broken away for clarity.
Figure 9:
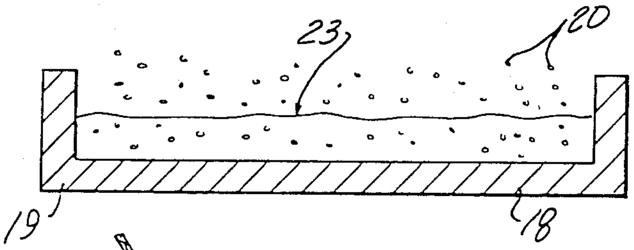
FIGS. 9–12 are cross sectional views of an open mold showing the successive steps in an alternate process for producing the device shown in FIG. 7.
Figure 11:
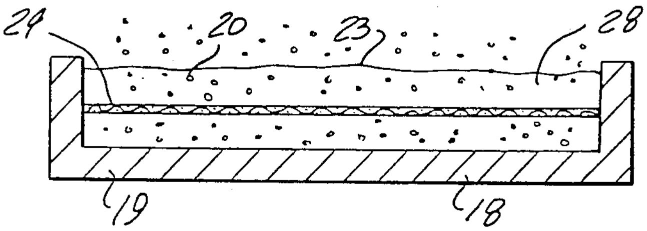
Figure 12:
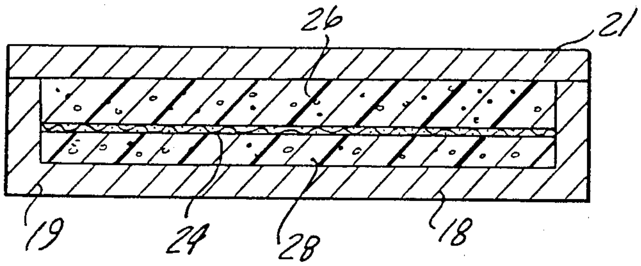

As previously discussed the particles 20 may not migrate entirely to the bottom of the mold cavity, depending upon their densities and the cure state of the resin when the particles are introduced therein, in which case the particles become and remain distributed throughout much of the entire depth of the resin layer during and after curing thereof. Depending upon the size and density of the distributed particles, the electrical continuity between the particles may be insufficient to act as a reflector of the electromagnetic energy. In this event, an alternate form of the invention may be employed which is depicted in FIGS. 7 and 8, the process for producing this alternative construction being shown in FIGS. 9–12. As shown in FIG. 9, the first manufacturing step consists of partially filling the mold 18 with a quantity of the uncured, thermoplastic resin following which a quantity of the particles 20 are introduced into the resin by depositing such particles on the upper surface 23. A substantially continuous, planar or distributed electrical conductor, preferably in the form of a sheet 24 of wire mesh or screen is then introduced into the mold 18 (FIG. 10), in overlying relationship to the lower layer of resin; the sheet 24 is preferably relatively flexible so as to readily bend during a later thermoforming process in those applications where a non-planar reflector is desired. In lieu of wire mesh, a metal coated fabric or a continuous layer of metal fibers which contact each other may be employed as the sheet 24. Sheet 24 may be introduced into the mold over the lower layers 26 of resin either before, during or after the lower layer 26 has cured. Following the introduction of sheet 24 into the mold 18, an upper layer 28 of resin is introduced into the mold 18 (FIG. 11) and a second quantity of the particles 20 is introduced into the upper layer 28 by depositing such particles on the upper surface 23 of the upper layer 28. Next, as depicted in FIG. 12, the top of the mold 21 is closed and the resin is allowed to cure. Following curing, the resulting composite may be thermoformed using conventional techniques into any of various configurations such as the dish-shape depicted in FIG. 1.

It is to be noted that the relative thickness of upper and lower layers 26 and 28 will determine the depth at which the sheet 24 is embedded and that the depth of sheet 24 will be governed by the size and density of the particles 20 which are introduced into the upper and lower levels 26 and 28 respectively. In any event, the sheet 24 cooperates with the embedded particles 20 to establish the electrical continuity required to effectively reflect the electromagnetic energy.

Figure 13:
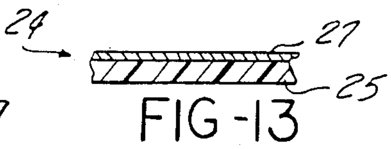
FIG. 13 is a view similar to FIG. 7, taken on a larger scale, but showing an alternate construction.

Attention is now directed to FIG. 13 wherein there is depicted a novel construction for assuring that the sheet 24 is properly oriented between upper and lower layers 28 and 26 respectively. In many applications requiring a non-planar reflector, proper contour of the antenna is essential to focusing the reflected electromagnetic energy at a particular area. For example, in the case of a parabolic reflector, it is highly desirable that the sheet 24 be of closely controlled parabolic shape so as to maximize the reflection of an electromagnetic energy on the collecting element 12 shown in FIG. 1. In order to assure proper contour and orientation in the final product, it is necessary that the sheet 24 be maintained in essentially planar disposition during the curing of the resin in upper and lower layers 26 and 28.

Figure 10:
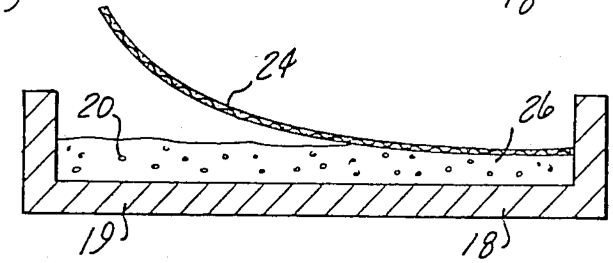

One method by which the sheet 24 may be held substantially planar during the curing process involves sandwiching such sheet 24 between two sheets of relatively thin plastic 30, 32, after which such sandwiched composite may be introduced into the mold 18 during the step depicted in FIG. 10. A conventional adhesive may be introduced between sheets 30 and 32, which adhesive penetrates through sheet 24 and holds the composite materials in sandwiched relationship. Sheets 30 and 32 are then formed readily into the desired final configuration along with upper and lower layers 26 and 28 by conventional thermoforming techniques as previously described.

Figure 14:
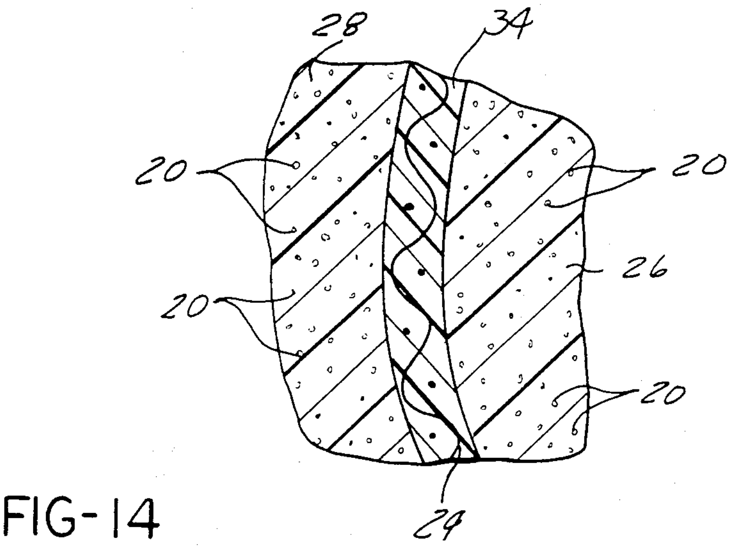
FIG. 14 is a view similar to FIG. 13, but showing another alternate construction.

Another method for assuring that the conductor sheet 24 is held substantially planar during the curing process is depicted in FIG. 14. In this embodiment the conductor sheet 24 is pressed, preferably by conventional roller techniques into a sheet of plastic 34, such as acrylic, while the sheet is in a plastic state, for example after extrusion. When sheet 34 cures or otherwise reaches a rigid state, the conductor sheet 24 is firmly embedded therein thus fixing sheet 24 in a planar attitude. The sheet 34 having conductor sheet 24 embedded therein may then be introduced into the mold 18 during the step depicted in FIG. 10. After removal from the mold 18 the resulting composite construction may be readily formed to the desired shape using thermoforming techniques.

Figure 15:
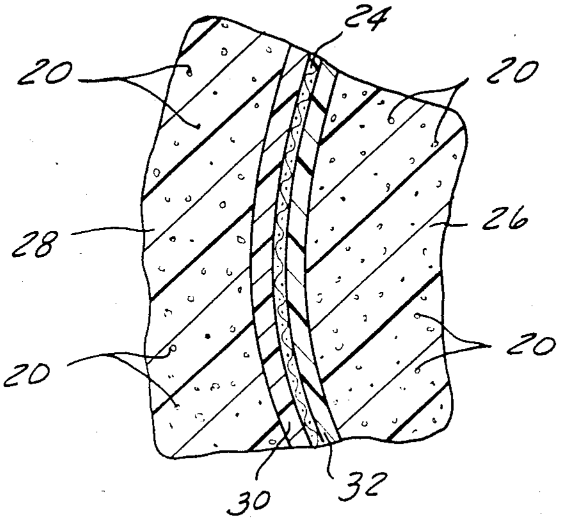
FIG. 15 is a fragmentary, cross-sectional view of a reflective sheet assembly.

As shown in FIG. 15, the sheet 24 may also consist of a thin, flexible continuous sheet of metal 27 bonded to a rigid layer 25 of plastic or the like. The sheet 24 may be introduced into the mold 18 during the step depicted in FIG. 10.

In view of the foregoing, it is apparent that the process described above, and the product produced thereby, not only provides for the reliable accomplishment of the objects of the invention but do so in a particularly cost-effective manner. It is recognized, of course, that those skilled in the art may make various modifications or additions to the preferred embodiment chosen to illustrate the invention without departing from the spirit and scope of the present contribution of the art. Accordingly, it is to be understood that the protection sought and to be afforded hereby should be deemed to extend to the subject matter claimed and all equivalents thereof fairly within the scope of the invention.

I claim:

1. An electromagnetic energy reflector, comprising:

a first and second layer of thermoplastic resin material substantially transparent to said electromagnetic energy;

a sheet of electrically conductive material having a thickness substantially less than the thickness of either of said first or second thermoplastic resin layers positioned between said first and second layers; and a quantity of electrically conductive particles embedded in at least one of said first and second layers, said particles being disposed in an electrically conductive relationship to said sheet and having a size and distribution density effective to cooperate with said sheet to establish electrical continuity within said reflector and effectively reflect said electromagnetic energy.

2. The reflector of claim 1, wherein said particles are embedded in each of said first and second layers.

3. The reflector of claim 1, including a third layer of thermoplastic resin material, said sheet of electrically conductive material being embedded in said third layer and the composite sheet structure, comprising said sheet of electrically conductive material embedded in said third layer, being positioned between said first and second layers.

4. The reflector of claim 1, including third and fourth layers of thermoplastic resin material, said sheet of electrically conductive material being sandwiched between said third and fourth layers and the composite sheet structure, comprising said sheet of electrically conductive material sandwiched between said third and fourth layers, being positioned between said first and second layers.

* * * * *